J. R. Streett,

Blow Pipe.

No. 104,078.  Patented June 7, 1870.

Witnesses:
Fred. Artos
Eli Lak

Inventor
James R. Streett

United States Patent Office.

JAMES R. STREETT, OF WASHINGTON, DISTRICT OF COLUMBIA, ASSIGNOR TO JAMES VERMILLION, OF SAME PLACE.

Letters Patent No. 104,078, dated June 7, 1870.

IMPROVEMENT IN BLOW-PIPES.

The Schedule referred to in these Letters Patent and making part of the same.

*To all whom it may concern:*

Be it known that I, JAMES R. STREETT, of Washington, in the county of Washington and District of Columbia, have invented a new and improved Automatic Blow-Pipe; and I do hereby declare that the following is a full and exact description of the same, reference being had to the accompanying drawings and to the letters of reference marked thereon.

My invention consists in a combination of a stop-cock with a branch tube upon the main stem of the blow-pipe, and a rubber or elastic bag upon such branch tube; and also, in a revolving tip, which may be thus adjusted in relation to the air-bag.

The general form of my improved blow-pipe may correspond to the ordinary curved tube with the saliva-chamber or bulb near the middle, as seen in the accompanying drawings, in which—

Figure 1:
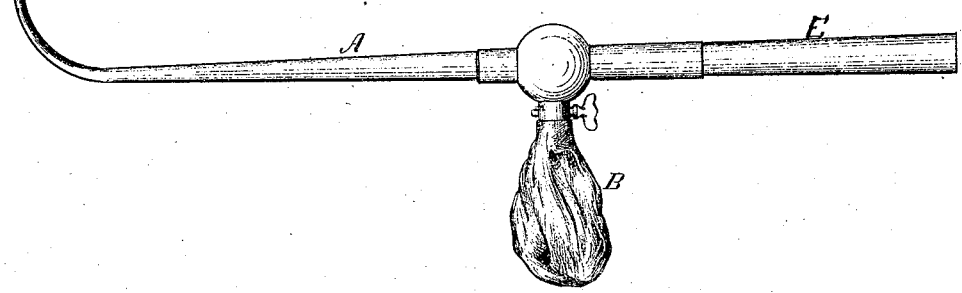

Figure 1 is a side view of my blow-pipe; and

Figure 2:
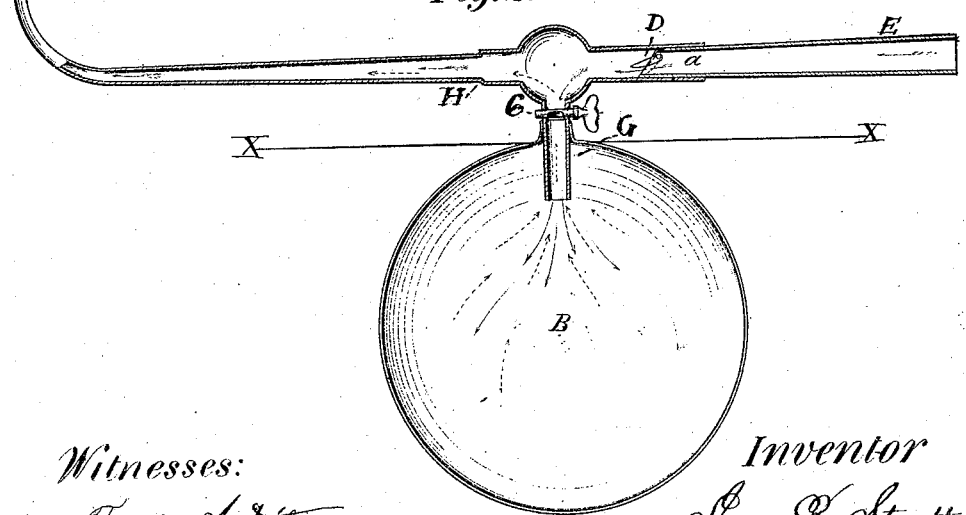

Figure 2, a section of the same.

The mouth-piece E is made removable, and provided with a valve, D, opening inwardly, as seen in the drawings, fig. 2, so as to admit the air freely to the pipe, and yet prevent any escape therefrom, the valve closing the moment the operator ceases to blow into the pipe.

Upon a branch pipe, G, near the middle of the main pipe or away from proximity to its tip, is placed a rubber or elastic air-bag, B, which may be inclosed in a net to prevent bursting, if necessary.

This branch tube has a stop-cock, C, by means of which the air may be shut into or out of the bag, at pleasure, or the size of the opening through the branch tube may be regulated, and the consequent amount of air received or discharged by the bag, in a given time, be completely controlled.

The blow-pipe is made with a joint at H, so that the tip may be turned in any direction in relation to the air-bag, according to the work or the position of the operator.

By this joint, and by placing the air-bag at a great distance from the tip of the pipe, both the bag and the air therein are not only kept cool, but the blow-pipe is thus rendered very convenient for use under different circumstances or in different situations.

I prefer to make the mouth-piece very short, say one inch in length.

An important feature of my improved blow-pipe is the extension of the branch tube G into the air-bag, beyond the line x x, fig. 2, or far enough to make the bag expand away from the end of the tube, and thus give space inside the bag, around the tube, for catching the saliva or aqueous vapor which condenses within the bag, and might be liable to flow out of the bag and be driven out of the blow-pipe into the flame, which would be a serious disadvantage.

Having described my invention,

I claim—

1. The arrangement and combination of the stop-cock C with the branch pipe G and bag B, substantially as set forth.

2. In combination with the air-bag, the revolving tip, in order to adjust the tip in relation to the bag, to suit the work, substantially as set forth.

This specification signed and witnessed this 14th day of January, 1870.

JAMES R. STREETT.

Witnesses:
CHAS. H. MILLER,
FRANK GODDEN.